(12) United States Patent
Braun et al.

(10) Patent No.: US 6,439,598 B1
(45) Date of Patent: Aug. 27, 2002

(54) HOUSING FOR INFLATABLE VEHICLE OCCUPANT PROTECTION DEVICE

(75) Inventors: William P. Braun, Romeo; John P. Wallner; Michael B. Kutchey, both of Rochester Hills; Thomas Osentoski, Marysville, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/695,092

(22) Filed: Oct. 24, 2000

(51) Int. Cl.[7] .......................... B60R 21/20; B60R 21/22
(52) U.S. Cl. .................... 280/728.2; 280/730.2
(58) Field of Search .................. 280/730.2, 728.3, 280/730.1, 728.2

(56) References Cited

U.S. PATENT DOCUMENTS

| | | | | |
|---|---|---|---|---|
| 5,676,393 A | * | 10/1997 | Rose | 280/728.3 |
| 5,755,457 A | | 5/1998 | Specht | |
| 5,884,937 A | * | 3/1999 | Yamada | 280/730.2 |
| 6,103,984 A | | 8/2000 | Bowers et al. | |

* cited by examiner

Primary Examiner—Peter C. English
(74) Attorney, Agent, or Firm—Tarolli, Sundheim, Covell, Tummino & Szabo L.L.P.

(57) ABSTRACT

An apparatus (12) for helping to protect an occupant of a vehicle (13) comprises an inflatable vehicle occupant protection device (14) having a deflated condition and being inflatable into a position to help protect the vehicle occupant. The apparatus (12) also comprises a housing (10) for mounting in the vehicle. The housing (10) includes a chamber (61) receiving the inflatable device in the deflated condition. The housing (10) includes a first housing part (60) having a locking rib (80), and a second housing part (90) having a locking groove (110) and an opening (114) into the locking groove. The locking rib (80) is movable in a first direction (70) through the opening (114) into the locking groove (110) for releasably closing the housing (10) with the inflatable device (14) inside the chamber. The first housing part (60) has a tool receiving portion (82) adjacent the locking rib (80). The tool receiving portion (82) has a tool receiving surface (84) extending transverse to the first direction (70) for receiving an assembly tool (130). The assembly tool (130) applies force to move the locking rib (80) in the first direction (70) through the opening (114) into the locking groove (110).

21 Claims, 4 Drawing Sheets

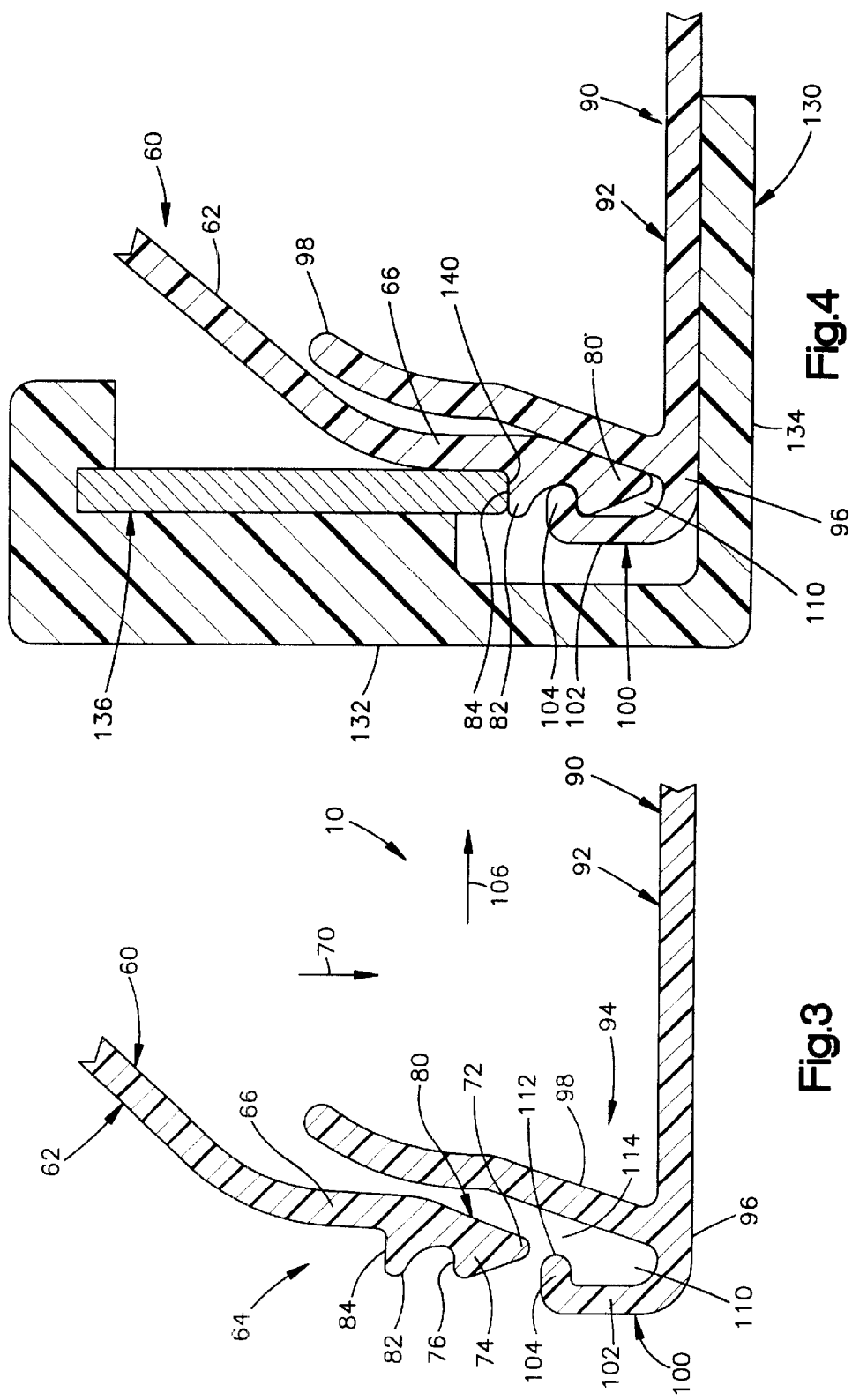

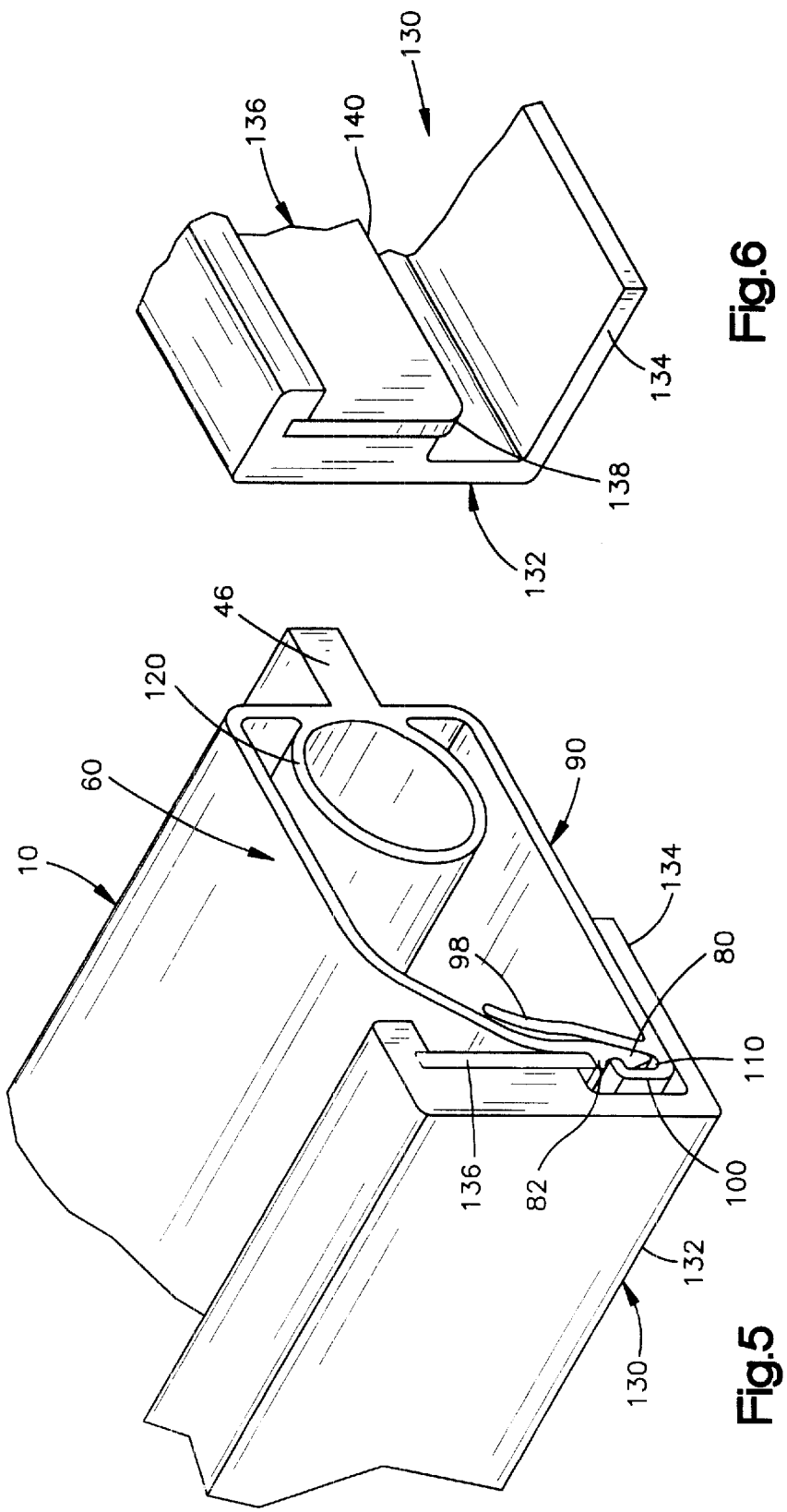

HOUSING FOR INFLATABLE VEHICLE OCCUPANT PROTECTION DEVICE

BACKGROUND OF THE INVENTION

1. Field of the Invention

The present invention relates to an apparatus for helping to protect a vehicle occupant in the event of a side impact to a vehicle and/or a vehicle rollover. In particular, the present invention relates to a housing for a side curtain or rollover air bag.

2. Description of the Prior Art

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Another type of inflatable vehicle occupant protection device is an inflatable tubular structure that inflates between a vehicle occupant and the side structure of the vehicle in the event of a side impact or a rollover. The inflatable device is typically enclosed in an extruded plastic housing. During assembly, the inflatable device is placed in a chamber in the housing, and the housing is then snapped shut by pushing a locking rib into a locking groove. This can be a difficult assembly step.

SUMMARY OF THE INVENTION

The present invention is an apparatus for helping to protect an occupant of a vehicle. The apparatus comprises an inflatable vehicle occupant protection device having a deflated condition and being inflatable into a position to help protect the vehicle occupant. The apparatus also comprises a housing for mounting in the vehicle. The housing includes a chamber receiving the inflatable device in the deflated condition. The housing includes a first housing part having a locking rib, and a second housing part having a locking groove and an opening into the locking groove. The locking rib is movable in a first direction through the opening into the locking groove for releasably closing the housing with the inflatable device inside the chamber. The first housing part has a tool receiving portion adjacent the locking rib. The tool receiving portion has a tool receiving surface extending transverse to the first direction for receiving an assembly tool for applying force to move the locking rib in the first direction through the opening into the locking groove.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is an enlarged sectional view of a cover that forms a portion of the apparatus of FIG. 1, shown in an opened condition;

FIG. 4 is a view similar to FIG. 3 showing the cover in a closed condition;

FIG. 5 is a perspective view showing the tool in use closing the cover; and,

FIG. 6 is a perspective view of a tool usable for closing the cover.

DETAILED DESCRIPTION OF AN EMBODIMENT

Figure 1:
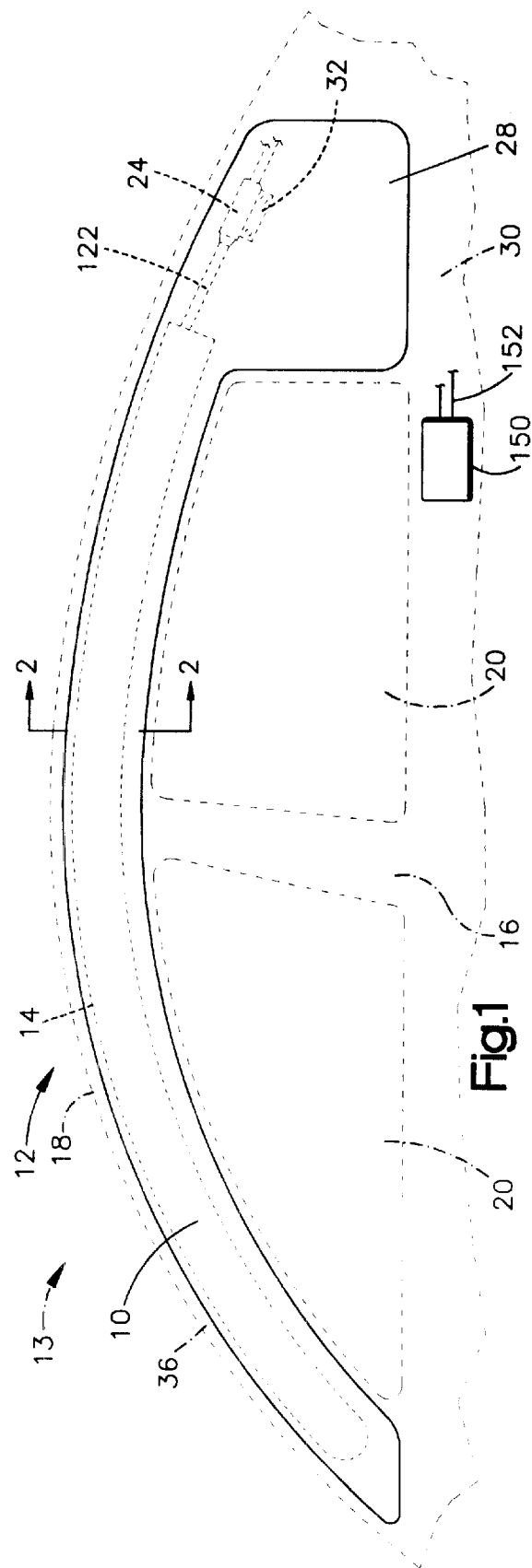
FIG. 1 is a schematic view of an inflatable apparatus for helping to protect a vehicle occupant illustrating the apparatus in a deflated condition, according to a first embodiment of the invention.

The present invention relates to an apparatus for helping to protect a vehicle occupant in the event of a side impact to a vehicle and/or a vehicle rollover. In particular, the present invention relates to a cover or housing for a side curtain or rollover air bag. The present invention is applicable to various housing constructions. As representative of the present invention, FIG. 1 illustrates a housing 10 that forms part of an apparatus 12 for helping to protect an occupant of a vehicle 13.

The apparatus 12 includes an inflatable vehicle occupant protection device in the form of an inflatable curtain 14 that is mounted adjacent to the side structure 16 of the vehicle 13 and a roof 18 of the vehicle. The side structure 16 of the vehicle 13 includes side windows 20.

The apparatus 12 includes an inflator 24 for providing inflation fluid to inflate the inflatable curtain 14. The inflator 24 contains a stored quantity of pressurized inflation fluid (not shown) in the form of a gas. The inflator 24 alternatively could contain a combination of pressurized inflation fluid and ignitable material for heating the inflation fluid, or could be a pyrotechnic inflator that uses the combustion of gas-generating material to generate inflation fluid.

The housing 10 stores the inflatable curtain 14 in a stored position prior to inflation of the curtain. The deflated inflatable curtain 14 and housing 10 have an elongate configuration and extend along the vehicle roof 18 and along the side structure 16 of the vehicle 13 above the side windows 20.

The housing 10 includes a portion 28 that extends downward adjacent to one of the side windows 20 of the vehicle 13 and overlies at least a portion of a C-pillar 30 of the vehicle. The inflator 24 is connected to the portion 28 of the housing 10 by known means 32, such as a clamp or bracket. The means 32 may include a portion that is constructed from the same piece of material as the housing 10.

The inflatable curtain 14 has a substantially gas-tight construction and is preferably made from coated, woven nylon. Other materials, such as elastomers, plastic films, or combinations thereof, may also be used to construct the inflatable curtain 14.

The vehicle side structure 16 (FIG. 2) includes a metal support rail 34 adjacent to and inside a roof panel 36. The support rail 34 is welded to the roof panel 36 at two locations 38. The vehicle side structure 16 also includes a window seal or bulb seal 40 that is supported on the roof panel 36 and the support rail 34. A vehicle door 42 supports the side window 20 and engages the bulb seal 40 when the door is closed.

The housing 10 is constructed of a single piece of homogeneous material and is preferably extruded or molded from a plastic material. The housing 10 includes a central body portion 44 and a mounting flange 46 that projects from the central body portion 44. The mounting flange 46 has a generally rectangular cross-section and includes at least one aperture 48 for receiving a fastener 50, such as a screw or bolt. The fastener 50 connects the housing 10 to the vehicle side structure 16. The fastener 50 may also connect a vehicle headliner 120 to the vehicle side structure 16.

The housing 10 includes an outer cover flap 60 and an inner cover flap 90. The cover flaps 60 and 90 extend from the central body portion 44 in directions away from the mounting flange 46 and away from each other. The cover flaps 60 and 90 extend for substantially the entire length of the housing portion that contains the curtain 14. The cover flaps 60 and 90 define a chamber 61 (FIG. 2) in which the curtain 14 is stored in the deflated condition.

The outer cover flap 60 includes a main body portion 62 and a closing portion 64. The closing portion 64 has a base section 66 (FIG. 3) that is formed as a continuation of the main body portion 62 of the outer cover flap 60. The base section 66 extends in a first direction indicated by the arrow 70. The base section 66 terminates in a pointed terminal edge portion 72 of the outer cover flap 60.

The closing portion 64 also includes a locking flange 74 that projects laterally from the base section 66. The locking flange 74 has a locking surface 76 that extends transverse to the first direction 70. In the illustrated embodiment, the locking surface 76 extends substantially perpendicular to the first direction 70. The locking flange 74 and the terminal edge portion 72 together form a locking rib 80 of the closing portion 64 of the outer cover flap 60.

The closing portion 64 of the outer cover flap 60 also includes a tool receiving portion or tool receiving flange 82. The tool receiving flange 82 has a generally triangular cross-sectional configuration similar to that of the locking flange 74. The tool receiving flange 82 extends laterally from the base section 66 of the closing portion 64, in a direction parallel to the locking flange 74. The tool receiving flange 82 has a tool receiving surface 84 that extends transverse to the first direction 70. In the illustrated embodiment, the tool receiving surface 84 extends substantially perpendicular to the first direction 70.

The inner cover flap 90 includes a main body portion 92 and a closing portion 94. The closing portion 94 has a base section 96 that is formed as a continuation of the main body portion 92 of the inner cover flap 90. The base section 96 extends generally perpendicular to the base section 66 of the closing portion 64 of the outer cover flap 60, when the housing 10 is in the closed condition shown in FIG. 4.

The closing portion 94 of the inner cover flap 90 also includes a retainer flange 98 and a hook 100. The retainer flange 98 extends from the base section 96, in a direction into the chamber 61 of the housing 10. The retainer flange 98 extends generally perpendicular to the base section 96 of the inner cover flap 90. The retainer flange 98 helps to hold the curtain 14 away from the interengaging closing portions 64 and 94 during assembly.

The hook 100 is spaced apart from the retainer flange 98 and is located at the end of the base section 96 of the inner cover flap. The hook 100 has an L-shaped cross-sectional configuration including a first portion 102 that extends from the base section 96 in a direction generally parallel to the retainer flange 98. A second portion or lip portion 104 of the hook 100 extends from the first portion 102 in a second direction 106 perpendicular to the first portion 102 and toward the retainer flange 98. The lip portion 104 thus extends generally perpendicular to the first direction 70.

The closing portion 94 of the inner cover flap 90 has a locking groove 110. The locking groove 110 is defined or bounded by the hook 110, the base section 96 and the retainer flange 98 of the inner cover flap 90. The lip portion 104 of the hook 100 terminates in a surface 112 spaced apart from the retainer flange 98. The surface 112 and the retainer flange 98 define between them an opening 114 into the locking groove 110.

The housing 10 includes a fill tube 120 (FIG. 2) that extends downward from the central body portion 44 of the housing, between the outer and inner flaps 60 and 90. The fill tube 120 has an elongated, tubular configuration and extends for a major portion of the length of the housing 10. A conduit 122 (FIG. 1) connects the inflator 24 to the fill tube 120 and provides fluid communication between the inflator and the fill tube.

Figure 2:
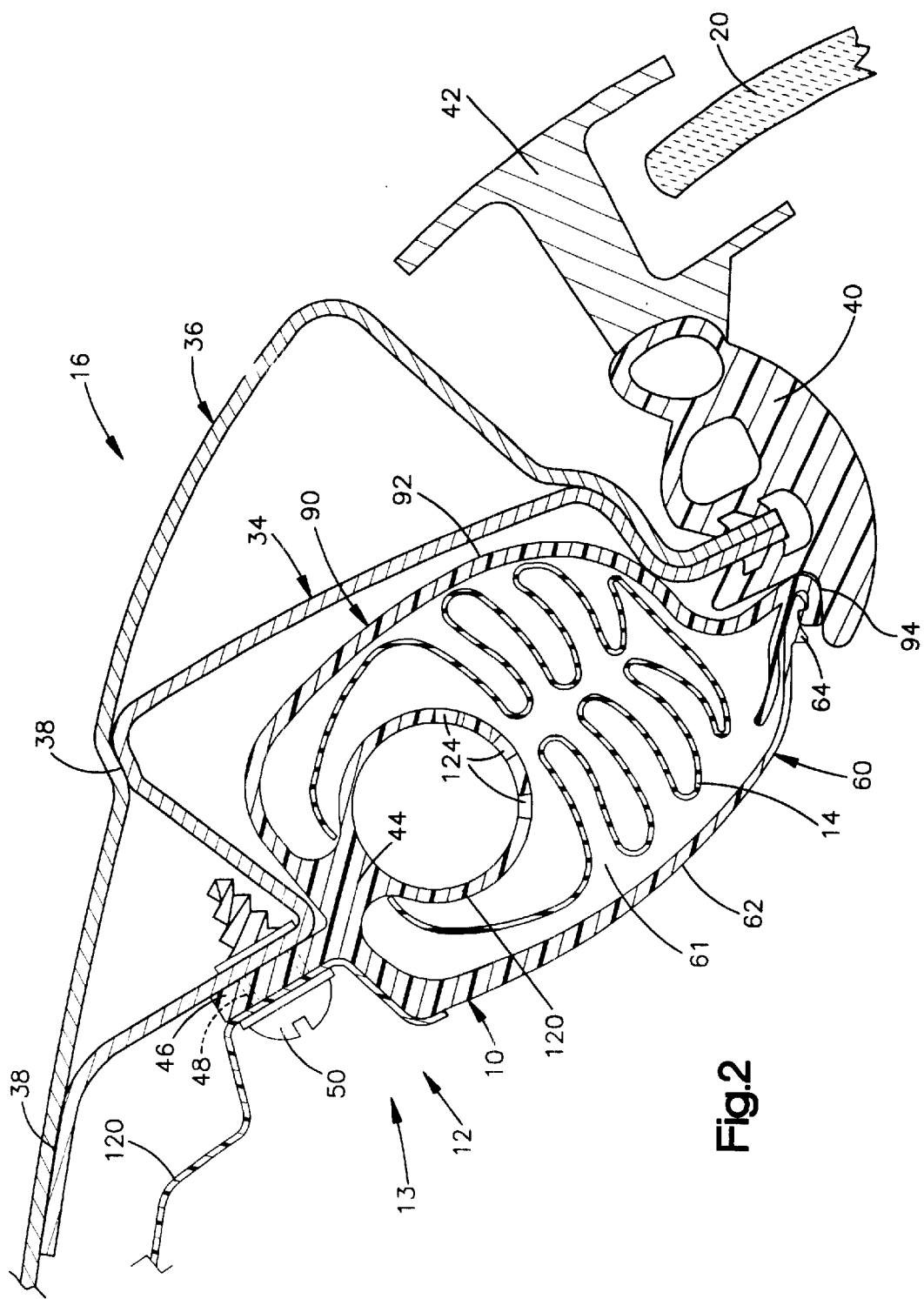
FIG. 2 is a sectional view of the apparatus taken generally along line 2—2 in FIG. 1.

The fill tube 120 has a plurality of inflation fluid outlets 124 (FIG. 2). The inflation fluid outlets 124 are openings that extend radially between the inner and outer side surfaces of the fill tube 120. The inflation fluid outlets 124 are spaced along the length of the fill tube 120 and are directed generally away from the central body portion 44 of the housing 10.

The cover flaps 60 and 90 have generally curved configurations and are resiliently movable between the closed condition illustrated in FIGS. 2 and 4 and the open condition illustrated in FIG. 3. When the housing 10 is in the open condition, the inflatable curtain 14 can be connected to the housing in a manner not shown, such as by stitching, bonding, hooks, or snap rings. When the inflatable curtain 14 is connected to the housing 10, the fill tube 120 is disposed in the inflatable volume of the curtain. The inflation fluid outlets 124 provide fluid communication between the fill tube 120 and the inflatable curtain 14.

After the inflatable curtain 14 is connected to the housing 10, the curtain is folded and the cover flaps 60 and 90 are closed around the curtain to store the curtain in the chamber 61 of the housing. Specifically, the closing portion 64 of the outer cover flap 60 is moved in the first direction 70 to engage and interlock with the closing portion 94 of the inner cover flap 90, with the use of a tool 130 shown in FIGS. 4–6.

The tool 130 has a main body portion 132 that includes a base 134. The tool 130 also includes a metal plate 136 secured to the main body portion 132. The metal plate 126 has a curved leading end portion 138 that merges with a linear edge portion 140. The linear edge portion 140 of the metal plate 136 extends parallel to the base 134, and is spaced apart from the base by a predetermined distance.

To close the housing 10, the outer cover flap 60 is positioned near the inner cover flap 90. The locking rib 80 on the outer cover flap 60 is near, but not in, the locking groove 110 in the inner cover flap 90.

The tool 130 is then moved into engagement with one end of the extruded housing 10. The leading end portion 138 of the metal plate 136 engages the tool receiving surface 84 on the tool receiving flange 82 of the closing portion 64 of the outer cover flap 60. The tool 130 is then moved along the length of the housing 10, to close the housing from one end to the other. As the tool 130 is moved along the length of the housing 10, the linear edge portion 140 of the metal plate 136 on the tool moves onto the tool receiving surface 84, forcing the tool receiving flange 82 to move closer to the base 134 of the tool.

The locking rib 80 of the outer cover flap 60 engages the lip portion 104 of the hook 100 and forces the hook to bend outward, away from the retaining flange 98. The locking rib 80 of the outer cover flap 60 is pushed through the opening 114. The predetermined distance between (a) the linear edge portion 140 of the metal plate 136 and (b) the base 124 of the tool 130 is selected to cause the locking rib 80 of the outer cover flap 60 to be positioned in the locking groove 110 of the inner cover flap 90. As this occurs, the hook 100 resiliently snaps back into the finished position shown in FIG. 4. The closing portion 64 of the outer cover flap 60 thus snaps into interlocking engagement with the closing portion 94 of the inner cover flap 90. The housing 10 is then in the closed condition shown in FIGS. 2 and 4.

The vehicle 13 includes a sensor mechanism 150 (shown schematically in FIG. 1) for sensing a side impact to the vehicle and/or a rollover of the vehicle. The sensor mechanism 150 actuates the inflator 24 in response to the sensing of a side impact or a vehicle rollover.

In the event of a rollover of the vehicle or a side impact to the vehicle 13 of a magnitude greater than a predetermined threshold value, the sensor mechanism 150 provides an electrical signal over lead wires 152 to the inflator 24. The electrical signal causes the inflator 24 to be actuated in a known manner. The inflator 24 discharges fluid under pressure through the conduit 122 and into the fill tube 120. The fill tube 120 directs the fluid into the inflatable curtain 14.

The inflatable curtain 14 inflates under the pressure of the inflation fluid from the inflator 24. The force of the inflating curtain 14 causes the closing portion 94 of the inner cover flap 90 to disengage from the closing portion 64 of the outer cover flap 60. The inflatable curtain 14 inflates away from the roof 18 in a downward direction as shown in the drawings and in a downward direction with respect to the direction of forward travel of the vehicle 13. The inflatable curtain 14, when inflated, can help to protect a vehicle occupant in the event of a vehicle rollover or a side impact to the vehicle 13. When inflated, the inflatable curtain 14 can help to absorb the energy of impacts with the curtain and helps to distribute the impact energy over a large area of the curtain.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a vehicle, said apparatus comprising:
   an inflatable vehicle occupant protection device having a deflated condition and being inflatable into a position to help protect the vehicle occupant; and
   a housing for mounting in the vehicle, said housing including a chamber receiving said inflatable device in the deflated condition;
   said housing including a first housing part having a locking rib and a second housing part having a locking groove and an opening into said locking groove;
   said locking rib being movable in a first direction through said opening into said locking groove for releasably closing said housing with said inflatable device inside said chamber;
   said first housing part having a tool receiving portion adjacent said locking rib, said tool receiving portion having a first tool receiving surface extending perpendicularly from a main body portion of said first housing part, said second housing part including a second tool receiving surface coextensive with a main body portion of said second housing part, said locking groove extending perpendicularly from said main body portion of said second housing part, said first and second tool receiving surfaces being for receiving an assembly tool for applying force to move said locking rib in said first direction through said opening into said locking groove.

2. An apparatus as set forth in claim 1 wherein said tool receiving portion of said first housing part is disposed outside said locking groove when said locking rib is in said locking groove.

3. An apparatus as set forth in claim 1 wherein said tool receiving portion of said first housing part has a generally triangular cross-sectional configuration.

4. An apparatus as set forth in claim 1 wherein said locking rib has a locking surface that extends transverse to said first direction, and said tool receiving surface on said tool receiving portion of said first housing part extends generally parallel to said locking surface on said locking rib.

5. An apparatus as set forth in claim 4 wherein said tool receiving portion of said first housing part has a generally triangular cross-sectional configuration.

6. An apparatus as set forth in claim 1 wherein said first and second housing parts are relatively movable from a closed condition to an open condition because of inflation of said protection device to enable movement of said protection device out of said chamber into the inflated condition, said locking rib disengaging from said locking groove upon movement of said first and second housing parts from the closed condition to the open condition.

7. An apparatus as set forth in claim 1 wherein said second housing part has a retainer flange that at least partially defines said locking groove.

8. An apparatus as set forth in claim 1 wherein said second housing part has a resiliently movable hook that at least partially defines said opening and said locking groove.

9. Apparatus as recited in claim 1, wherein said locking groove is partially defined by a hook portion and a retainer flange of said second housing part, said hook portion including a first part extending perpendicularly from said main body portion of said second housing part and a second part extending perpendicularly from said first part into said locking groove, said retainer flange being spaced from said hook portion and extending from said main body portion of said second housing part generally parallel to said hook portion.

10. An apparatus for helping to protect an occupant of a vehicle that has a side structure and a roof, said apparatus comprising:
    an inflatable vehicle occupant protection device having a deflated condition and being inflatable in a direction away from the vehicle roof into a position between the side structure of the vehicle and a vehicle occupant; and
    a housing for mounting in the vehicle in a position extending along the vehicle, said housing including a chamber extending along the length of said housing, said chamber receiving said inflatable device in the deflated condition;
    said housing including a first housing part having a locking rib and a second housing part having a locking groove and an opening into said locking groove;
    said locking rib being movable in a first direction through said opening into said locking groove for releasably closing said housing with said inflatable device inside said chamber;
    said first housing part having a tool receiving portion adjacent said locking rib, said tool receiving portion having a first tool receiving surface extending perpendicularly from a main body portion of said first housing part, said second housing part including a second tool receiving surface coextensive with a main body portion of said second housing part, said locking groove extending perpendicularly from said main body portion of said second housing part, said first and second tool receiving surfaces being for receiving an assembly tool for applying force to move said locking rib in said first direction through said opening into said locking groove.

11. An apparatus as set forth in claim 10 wherein said tool receiving portion of said first housing part is disposed outside locking groove when said licking rib is in said locking groove.

12. An apparatus as set forth in claim 10 wherein said tool receiving portion of said first housing part has a generally triangular cross-sectional configuration.

13. An apparatus as set forth in claim 10 wherein said locking rib has a locking surface that extends transverse to said first direction, and said tool receiving surface on said tool receiving portion of said first housing part extends generally parallel to said locking surface on said locking rib.

14. An apparatus as set forth in claim 11 wherein said tool receiving portion of said first housing part has a generally triangular cross-sectional configuration.

15. An apparatus as set forth in claim 10 wherein said first and second housing parts are relatively movable from a closed condition to an open condition because of inflation of said protection device to enable movement of said protection device out of said chamber into the inflated condition between the occupant and the vehicle side structure, said locking rib disengaging from said locking groove upon movement of said first and second housing parts from the closed condition to the open condition.

16. An apparatus as set forth in claim 10 wherein said second housing part has a retainer flange that at least partially defines said locking groove.

17. An apparatus as set forth in claim 10 wherein said second housing part has a resiliently movable hook that at least partially defines said opening and said locking groove.

18. Apparatus as recited in claim 9, wherein said locking groove is partially defined by a hook portion and a retainer flange of said second housing part, said hook portion including a first part extending perpendicularly from said main body portion of said second housing part and a second part extending perpendicularly from said first part into said locking groove, said retainer flange being spaced from said hook portion and extending from said main body portion of said second housing part generally parallel to said hook portion.

19. An apparatus for helping to protect an occupant of a vehicle, said apparatus comprising:
   an inflatable vehicle occupant protection device having a deflated condition and being inflatable into a position to help protect the vehicle occupant; and
   a housing constructed of a single piece of homogeneous material for mounting in the vehicle, said housing including a chamber receiving said inflatable device in the deflated condition, said housing comprising:
      a central body portion;
      an outer cover flap extending away from said central body portion, said outer cover flap including a first terminal edge positioned opposite said central body portion and extending along the length of said housing, said outer cover flap including a locking rib extending along said first terminal edge;
      an inner cover flap extending away from said central body portion and away from said outer cover flap, said inner cover flap including a second terminal edge positioned opposite said central body portion and extending along the length of said housing, said inner cover flap including a locking groove and an opening into said locking groove extending along said second terminal edge edge, said locking groove extending perpendicularly from said inner cover flap; and
      a fill tube extending from said central body portion between said outer and inner cover flaps,
         said locking rib being movable in a first direction through said opening into said locking groove for releasably connecting said outer and inner cover flaps to close said housing with said inflatable device inside said chamber,
      said outer cover flap having a tool receiving portion adjacent said locking rib, said tool receiving portion having a tool receiving surface extending transverse to said first direction for receiving an assembly tool for applying force to move said locking rib in said first direction through said opening into said locking groove.

20. An apparatus for helping to protect an occupant of a vehicle, said apparatus comprising:
   an inflatable vehicle occupant protection device having a deflated condition and being inflatable into a position to help protect the vehicle occupant; and
   a housing for mounting in the vehicle, said housing including a chamber receiving said inflatable device in the deflated condition, said housing comprising:
      a central body portion;
      an outer cover flap extending away from said central body portion, said outer cover flap including a first terminal edge positioned opposite said central body portion and extending along the length of said housing, said outer cover flap including a locking rib extending along said first terminal edge; and
      an inner cover flap extending away from said central body portion and away from said outer cover flap, said inner cover flap including a second terminal edge positioned opposite said central body portion and extending along the length of said housing, said inner cover flap including a locking groove and an opening into said locking groove extending along said second terminal edge, said locking groove extending perpendicularly from said inner cover flap, said locking rib being movable in a first direction through said opening into said locking groove for releasably connecting said outer and inner cover flaps to close said housing with said inflatable device inside said chamber;
      said outer cover flap having a tool receiving portion adjacent said locking rib, said tool receiving portion having a flat tool receiving surface extending transverse to said first direction for receiving an assembly tool for applying force to move said locking rib in said first direction through said opening into said locking groove.

21. An apparatus for helping to protect an occupant of a vehicle, said apparatus comprising:
   an inflatable vehicle occupant protection device having a deflated condition and being inflatable into a position to help protect the vehicle occupant; and
   a housing for mounting in the vehicle, said housing including a chamber receiving said inflatable device in the deflated condition, said housing comprising:
      a central body portion;
      an outer cover flap extending away from said central body portion, said outer cover flap including a first terminal edge positioned opposite said central body portion and extending along the length of said housing, said outer cover flap including a locking rib extending along said first terminal edge; and
      an inner cover flap extending away from said central body portion and away from said outer cover flap, said inner cover flap including a second terminal edge positioned opposite said central body portion and extending along the length of said housing, said inner cover flap including a locking groove and an opening into said locking groove extending along said second terminal edge, said locking groove extending perpendicularly from said inner cover flap, said locking rib being movable in a first direction
  through said opening into said locking groove for releasably connecting said outer and inner cover flaps to close said housing with said inflatable device inside said chamber, said terminal edges of said outer and inner cover flaps extending transverse to each other when said housing is closed;
said outer cover flap having a tool receiving portion adjacent said locking rib, said tool receiving portion having a tool receiving surface extending transverse to said first direction for receiving an assembly tool for applying force to move said locking rib in said first direction through said opening into said locking groove.

* * * * *

UNITED STATES PATENT AND TRADEMARK OFFICE
CERTIFICATE OF CORRECTION

PATENT NO. : 6,439,598 B1
DATED : August 27, 2002
INVENTOR(S) : William P. Braun et al.

It is certified that error appears in the above-identified patent and that said Letters Patent is hereby corrected as shown below:

Column 7,
Line 1, after "outside" insert -- said --.
Line 11, delete "11" and insert -- 13 --.
Line 28, delete "9" and insert -- 10 --.

Signed and Sealed this

Eighteenth Day of November, 2003

JAMES E. ROGAN
*Director of the United States Patent and Trademark Office*